T. J. BRANDT.
ICE CREAM CONE DISHER.
APPLICATION FILED MAY 1, 1914.
1,138,533.
Patented May 4, 1915.
2 SHEETS—SHEET 2.
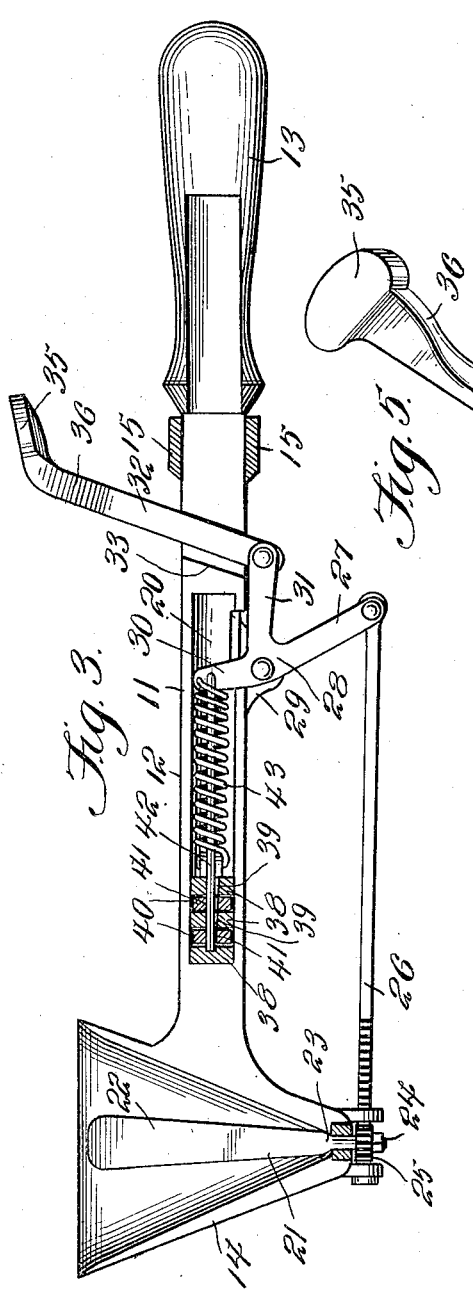
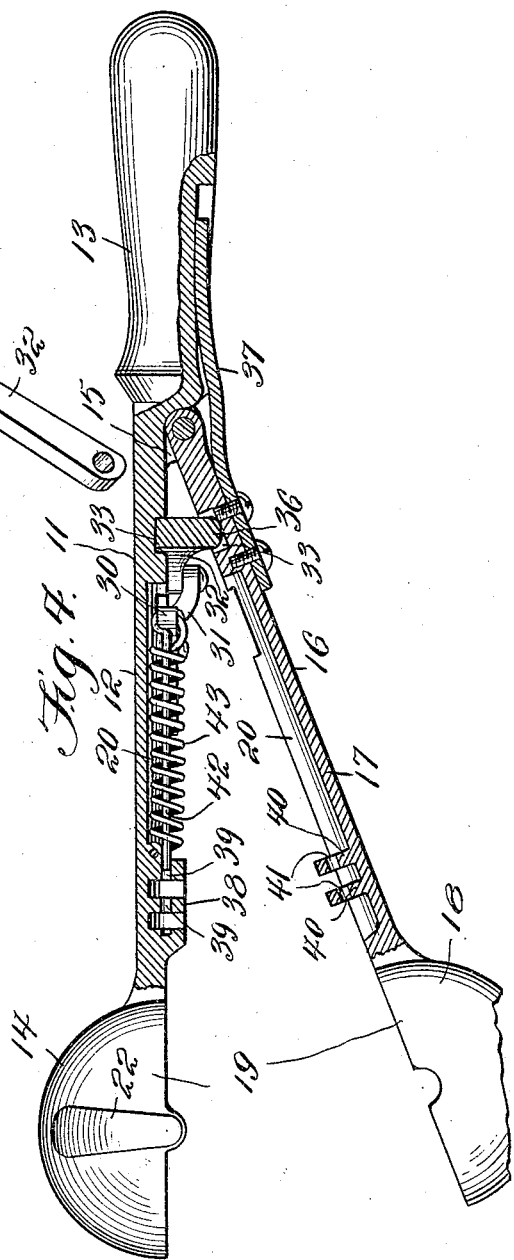
Inventor
Theodore J. Brandt
By Victor J. Evans
Attorney
Witnesses

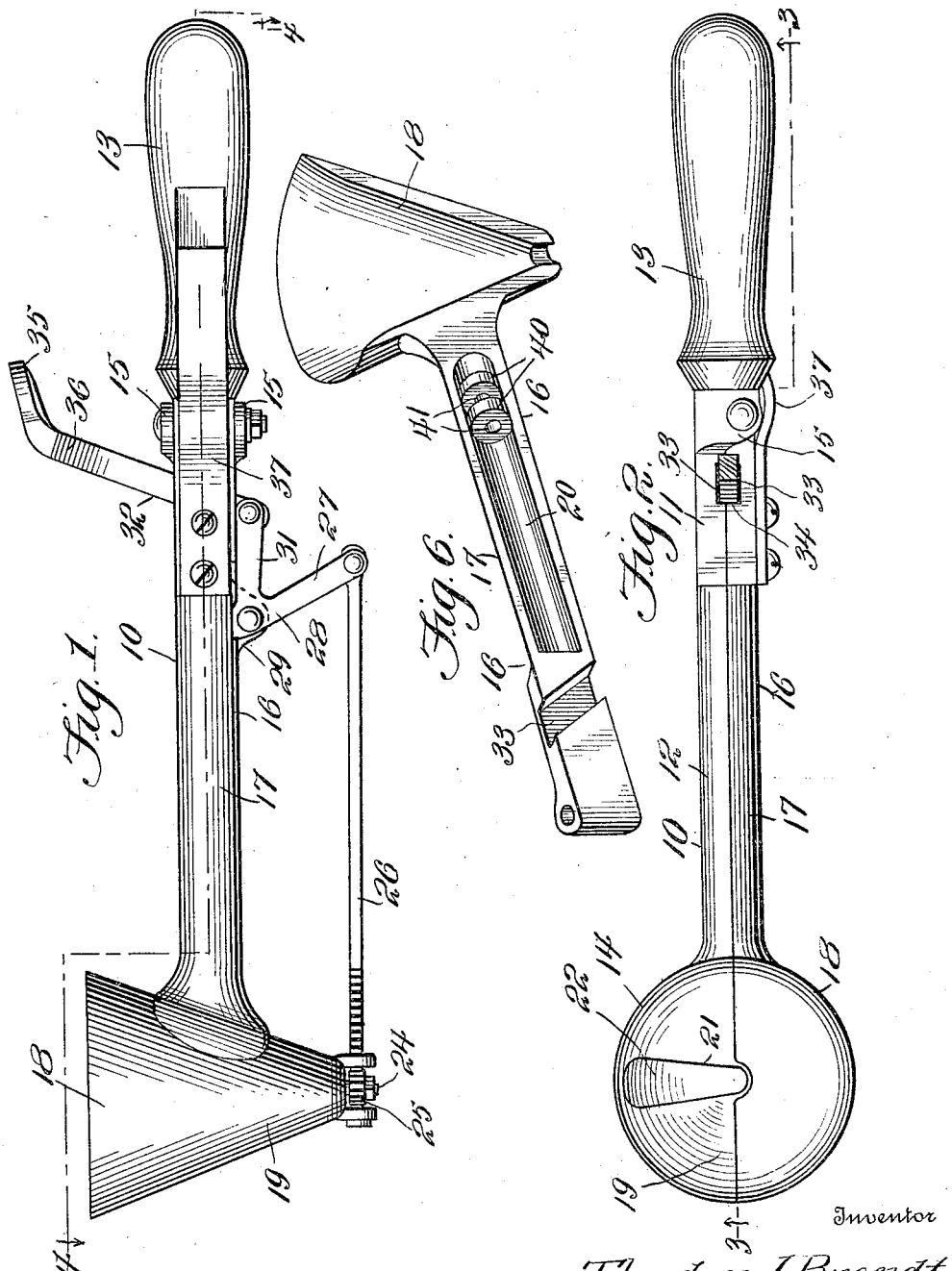

UNITED STATES PATENT OFFICE.

THEODORE J. BRANDT, OF GRESHAM, OREGON, ASSIGNOR, BY MESNE ASSIGNMENTS, TO NATIONAL SPECIALTY COMPANY, OF PORTLAND, OREGON, A CORPORATION OF OREGON.

ICE-CREAM-CONE DISHER.

1,138,533.  Specification of Letters Patent.  Patented May 4, 1915.

Application filed May 1, 1914. Serial No. 835,667.

*To all whom it may concern:*

Be it known that I, THEODORE J. BRANDT, a citizen of the United States, residing at Gresham, in the county of Multnomah and State of Oregon, have invented new and useful Improvements in Ice-Cream-Cone Dishers, of which the following is a specification.

The invention relates to devices for forming cream, or similar substances of a plastic nature, into cone-like configurations, and has for an object to provide a device of this character and which, when the cream or other substance has been molded in the configuration of a cone, discharges the molded substance into a suitable receptacle or cone-like structure.

The invention is primarily adapted for use in connection with receptacles ordinarily known as ice cream cones and which consist of a cone-like structure made of batter or other suitable edible substance and which is adapted to contain a cone-like body of ice cream, the device herein described being adapted to form the ice cream into a cone and discharge the same into the receptacle mentioned. Although I am aware that devices of this kind have been used heretofore, a large number of these devices are found unpractical inasmuch as they do not properly mold the cream into the desired shape and furthermore are clumsy in their operation so that the method of forming the cone and discharging the same into a receptacle cannot be expeditiously performed.

My device comprehends a structure of a simple and durable construction which permits of dishing up the cream in the desired quantity, and forming the same into a cone, after which the finished cone of cream is discharged into the cone-like receptacle without destroying the cone-like shape of the cream, the entire operation being expeditiously and quickly performed, and the device with which it is performed being of a construction which permits of it being cheaply manufactured.

In the further disclosure of the invention reference is to be had to the accompanying drawings, constituting a part of this specification, in which similar characters of reference denote corresponding parts in all the views, and in which:

Figure 1 is a side elevation of the device, showing the same in closed position; Fig. 2 is a plan view; Fig. 3 is a vertical sectional view taken on the line 3—3 in Fig. 2; Fig. 4 is a horizontal sectional view taken on the line 4—4 in Fig. 1, the device in this view being shown in open position; Fig. 5 is a perspective view of the trigger and operating member; and Fig. 6 is a perspective view of the movable section, looking at the interior thereof.

Referring more particularly to the views, I disclose an ice cream cone disher 10 consisting of a stationary body 11 including a semi-circular shank 12 terminating at one end in a handle 13 and at the other end in a mold section 14 rigid with the shank 12. A plurality of ears 15 are struck from the shank 12 adjacent the handle 13 and mounted to swing thereon is a movable body 16 including a semi-circular shank 17 and a mold section 18, the said movable body 16, when in normal and closed position on the stationary body 11, being arranged so that the mold sections 14 and 18 will constitute a complete conical mold 19 and the shanks 12 and 17 will form a tubular compartment 20.

A cutting member 21 includes a blade 22 and an integral angularly extending arm 23, from which projects a pin 24 passing through the lower end of the mold section 14 of the stationary body 11 so that the cutting member 21 can rotate within the conical mold 19, as will be readily understood by referring to the views, a suitable toothed wheel 25 being keyed to the lower projecting end of the pin 24 and engaged by a rack bar 26 mounted to swing on the lower arm 27 of a trigger 28 which is mounted to swing on an ear 29 depending from the under side of the shank 12 so that an upper arm 30 of the trigger 28 will extend within the shank 12 and lie within the tubular compartment 20 when the shanks 12 and 17 are in relatively closed position. The trigger 28 includes a rearwardly extending arm 31 having pivotal connection with the lower end of an operating member 32 arranged to pass transversely through the tubular compartment 20 formed by the shanks 12 and 17 when they are in relatively closed position, each of the shanks 12 and 17 being provided with a cut away portion 33 which forms an opening 34, through which the operating member 32 passes. The operating member 32 includes a knob 35, and adjacent the knob the operating member is flared to provide a separate portion 36, the edges of which engage the shanks 12 and 17 so that when a downward pressure is exerted on the knob 35 the said shanks will be swung into relatively open position, thus also separating the mold sections 14 and 18. A flat spring 37 is carried on the shank 12 adjacent the handle 13 and engages the movable body 16 to normally hold the same in closed position relatively to the stationary body 11.

A female member 38 provided with registering openings 39 is rigidly arranged within the shank 12 and similarly, a second female member 40 is rigidly arranged within the shank 17, the said member 40 having an opening 41 which, when the shanks 12 and 17 are in relatively closed position, will register with the openings 39 in the member 38, the said members being then in relative engagement as shown. A locking rod 42 is mounted to swing on the upper arm 30 of the trigger 28, thus lying within the tubular compartment 20 formed by the shanks 12 and 17 when in closed position, and an end of the locking rod 42 passes through the registering openings 39 and 41, thus locking the shanks in closed position, a suitable contractile spring 43 being arranged to encircle the locking rod 42 and having one end thereof connected to the upper arm 30 of the trigger 28 and the other end connected to the female member 38.

Now in the use of the device described, it will be apparent that the members 38 and 40, coöperate with the locking rod 42 normally retaining the movable body 16 in locked position relatively to the stationary body 11 so that the device can be grasped by the handle 13 and dipped into a can of cream for the purpose of scooping up a sufficient quantity of cream in the conical mold 19 formed by the mold sections 14 and 18. When the desired amount of cream has been received in the mold 19, a downward pressure is exerted on the knob 35, thus actuating the trigger 28 and moving the rack bar 26 forwardly to rotate the toothed wheel 25, thus rotating the blade 22 of the cutting member 21 within the mold 19 to sever the cream from the walls of the mold sections 14 and 18. While this operation is being carried on it will be apparent that the arm 30 of the trigger 28 will swing rearwardly within the tubular compartment 20 and against the contractile action of the spring 43, thus moving the rod out of engagement with the female member 40 carried by the shank 17 so that the shanks 12 and 17 will be relatively unlocked. Now a continued downward pressure on the knob 35 will cause the separating portion 36 of the knob to engage the shanks 12 and 17, thus swinging the shank 17 outwardly from the shank 12 so that the mold section 18 will be moved out of engagement with and spaced from the mold section 14 so that the cone of cream contained in the mold can readily drop into a suitable conical receptacle provided for the reception of the cone of cream, the said receptacle preferably having a conical shape and made of batter or other edible material. Now when the finished cream cone has been discharged from the separated mold 19, the downward pressure on the knob 33 is released and the action of the contractile spring will restrict the trigger 28 so that the locking rod 42 will be moved into reengagement with the female member 40 after the said member has been reëngaged with the female member 38, due to the fact that the spring 37, pressing against the movable body 16, tends to return the movable body into closed position relatively to the stationary body at the moment that the separating portion 36 of the operating member 33 moves out of engagement with the edges of the shanks 12 and 17. Therefore, with a device of the class described, it will be seen that the operation of cutting the cream from the inner wall of the mold, separating the mold sections to discharge the cream and, prior to this, unlocking the movable body from the stationary body in order that the mold sections may be relatively separated, is all accomplished in the operation of a single member, namely, the operating member 32, and it will be further apparent that when the operating member has been initially actuated and is released after accomplishing the desired object, the parts of the device which have been separated will quickly return to their normal positions and the device will be again ready to dish up another quantity of cream for the purpose of forming an ice cream cone.

By having the various parts of my device of a simple and durable construction, which will be readily seen by referring to the views, it will be apparent that the disher presents a structure which is not only prevented from easily getting out of order but which can be cheaply manufactured and sold at a reasonable price to a jobber or retailer in the cream cone business.

Having thus described my invention, I claim:

1. In an ice cream cone disher, the combination with a semi-circular shank, of a handle carried at one end thereof, a mold section carried at the other end thereof, a second semi-circular shank mounted to swing on the first semi-circular shank and normally engaging the same to form a tubular compartment, a mold section carried by the second shank and adapted to form a conical mold with the first mentioned mold section, a trigger mounted to swing on the first shank, a cutting member mounted to rotate on the first mold section and adapted to rotate in the second mold section, a rack bar carried by the trigger, a toothed wheel on the cutting member and adapted to be engaged by the rack bar to rotate the cutting member in the said mold when the said trigger is actuated, a plurality of interlocking members, one of the said members being carried within one of the said shanks and the other said member carried within the other said shank, a locking rod carried by the trigger for normally holding the said members in locked relation to secure the said shanks and said mold sections in locked relation, a spring carried by the first mentioned shank and engaging the second shank to normally hold the second shank in engagement with the first shank, and an operating member having connection with the said trigger to actuate the same and adapted to engage the said shanks and swing the same from against the action of the said springs to separate the said mold sections, the said trigger, when actuated, being adapted to move the said locking rod out of engagement with one of the said locking members to unlock the movable shank relatively to the rigid shank.

2. In an ice cream cone disher, the combination with a shank, of a handle carried thereby, a mold section on the shank and rigid therewith, a second shank mounted to swing on the first shank and forming a tubular compartment therewith, a second mold section carried by the second shank to form a conical mold with the first mold section, a trigger mounted to swing on the first shank, a plurality of normally engaging female members carried by the said shanks, with one of the members on one of the shanks and the other member on the other shank, a locking rod carried by the trigger and engaging the said members to normally lock the same and secure the said shanks and said mold sections in relatively locked position, a spring engaging the second shank for holding the same in engagement with the first shank and for holding the second mold section in engagement with the first mold section and an operating member passing through the shanks and having connection with the trigger to actuate the same and move the locking rod into unlocked position, with a portion of the trigger adapted to engage the shanks and swing the said second shank and said second mold section into open position relatively to the first shank and first mold section.

3. In an ice cream cone disher, the combination with a stationary body including a mold section, of a movable body mounted to swing on the stationary body and including a mold section, the said mold sections normally engaging and forming a conical mold, a trigger mounted to swing on the stationary body, means carried by the trigger for normally locking the movable body to the stationary body, and an operating member having connection with the trigger to actuate the same and to engage the said movable body to swing the same into open position relatively to the stationary body after the said movable body has been unlocked from the stationary body.

4. In an ice cream cone disher, the combination with a stationary body including a mold section, of a movable body mounted to swing on the stationary body and including a mold section, the said mold sections normally engaging and forming a conical mold, a trigger mounted to swing on the stationary body, means carried by the trigger for normally locking the movable body to the stationary body, an operating member having connection with the trigger to actuate the same and to engage the said movable body to swing the same into open position relatively to the stationary body after the said movable body has been unlocked from the stationary body, and a flat spring carried by the stationary body and engaging the movable body to normally hold the movable body in closed position relatively to the stationary body.

5. In an ice cream cone disher, the combination with a stationary body including a mold section, of a movable body mounted to swing on the stationary body and including a mold section, the said mold sections normally engaging and forming a conical mold, a trigger mounted to swing on the stationary body, means carried by the trigger for normally locking the movable body to the stationary body, an operating member having connection with the trigger to actuate the same and to engage the said movable body to swing the same into open position relatively to the stationary body after the said movable body has been unlocked from the stationary body, a flat spring carried by the stationary body and engaging the movable body to normally hold the movable body in closed position relatively to the stationary body, a cutting member mounted to rotate in the said mold, and means carried by the said trigger for actuating the cutting member when the said trigger is actuated by the said operating member.

In testimony whereof I affix my signature in presense of two witnesses.

THEODORE J. BRANDT.

Witnesses:
  LOU HOYTE,
  ANDREW HANSEN.